(12) United States Patent
Tsuboi et al.

(10) Patent No.: US 6,995,116 B2
(45) Date of Patent: Feb. 7, 2006

(54) REVERSIBLE MULTICOLOR RECORDING MEDIUM, AND RECORDING METHOD USING THE SAME

(75) Inventors: Hisanori Tsuboi, Kanagawa (JP); Noriyuki Kishii, Kanagawa (JP); Kenichi Kurihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 215 days.

(21) Appl. No.: 10/645,168

(22) Filed: Aug. 19, 2003

(65) Prior Publication Data

US 2004/0115404 A1    Jun. 17, 2004

(30) Foreign Application Priority Data

Aug. 19, 2002  (JP)  .............................. 2002-238153

(51) Int. Cl.
*B41M 5/30* (2006.01)

(52) U.S. Cl. .................. 503/201; 503/204; 503/226

(58) Field of Classification Search ............... 503/201, 503/204, 200, 226
See application file for complete search history.

(56) References Cited

U.S. PATENT DOCUMENTS

| | | | | |
|---|---|---|---|---|
| 5,296,439 | A | * | 3/1994 | Maruyama et al. ......... 503/201 |
| 5,409,797 | A | | 4/1995 | Hosoi et al. |
| 6,815,679 | B2 | * | 11/2004 | Azuma .................... 250/316.1 |

FOREIGN PATENT DOCUMENTS

| | | |
|---|---|---|
| EP | 0 633 145 A1 | 1/1995 |
| EP | 0 734 870 A2 | 10/1996 |
| EP | 0 999 071 A2 | 5/2000 |
| JP | 54-119377 | 9/1979 |
| JP | 55-154198 | 12/1980 |
| JP | 63-041186 | 2/1988 |
| JP | 63-039377 | 12/1988 |
| JP | 02-188293 | 7/1990 |
| JP | 02-188294 | 7/1990 |
| JP | 05-062189 | 3/1993 |
| JP | 05-124360 | 5/1993 |
| JP | 06-079970 | 3/1994 |
| JP | 06-305247 | 11/1994 |
| JP | 06-328844 | 11/1994 |
| JP | 07-108761 | 4/1995 |
| JP | 08-058245 | 3/1996 |
| JP | 08-080682 | 3/1996 |
| JP | 08-164669 | 6/1996 |
| JP | 08-197853 | 8/1996 |
| JP | 08-300825 | 11/1996 |
| JP | 09-052445 | 2/1997 |
| JP | 11-138997 | 5/1999 |
| JP | 2000-025338 | 1/2000 |
| JP | 2000-198275 | 7/2000 |
| JP | 2001-001645 | 1/2001 |
| JP | 2001-1645 | 1/2001 |
| JP | 2001-105733 | 4/2001 |
| JP | 2001-113829 | 4/2001 |
| JP | 2001-162941 | 6/2001 |
| JP | 2002-059654 | 2/2002 |

* cited by examiner

*Primary Examiner*—Bruce Hess
(74) *Attorney, Agent, or Firm*—Bell, Boyd & Lloyd LLC

(57) ABSTRACT

A reversible multicolor recording medium includes a supporting substrate, and recording layers which have, respectively, a plurality of reversible thermal coloring compositions having different colors. The recording layers are separated from and stacked on one another on the supporting substrate. The reversible thermal coloring compositions respectively include light-to-heat transforming materials which respectively absorb infrared rays having different wavelength ranges to generate heat.

10 Claims, 2 Drawing Sheets

REVERSIBLE MULTICOLOR RECORDING MEDIUM, AND RECORDING METHOD USING THE SAME

The present invention relates to a reversible multicolor recording medium for recording image or data, and a recording method using the same.

BACKGROUND OF THE INVENTION

Recently, the necessity of a rewritable recording technique is strongly recognized from the viewpoint of protecting the environment. In accordance with the progress of computer network technology, communication technology, OA machines, recording media, and memory media, paperless technology is being spread at offices and homes. Recording media onto which information can be recorded and erased reversibly utilizing heat, so-called reversible thermal recording media are one of display media used as a substitute for printed materials, and, as a variety of prepaid cards, point cards, credit cards, and IC cards spread, the reversible thermal recording media have been practically used in the applications in which the balance or other recorded information is needed to be visible or readable, and further they are being brought into practical use in the applications of copying machine and printer.

The reversible thermal recording medium and a recording method using the same are described in, for example, Unexamined Japanese Patent Application Laid-Open Specification Nos. 54-119377, 55-154198, 63-39377, and 63-41186. These are so-called low-molecular substance dispersion type recording media, that is, recording media comprising an organic low-molecular weight substance dispersed in a resin matrix, and the light scattering on the media is changed by thermal history to make the recording layer an opaque or transparent state. Therefore, these media have drawbacks in that the contrast between an image formed portion and an image unformed portion, namely an image portion and the other portion is unsatisfactory, and therefore, only media which are improved in the contrast by providing a reflective layer under the recording layer have been put into practical use.

On the other hand, Unexamined Japanese Patent Application Laid-Open Specification Nos. 2-188293, 2-188294, 5-124360, 7-108761, and 7-188294 disclose a leuco dye type recording medium, that is, a recording medium having a recording layer comprising a leuco dye, which is an electron donating color-forming compound, and a developer dispersed in a resin matrix, and a recording method using the same. In the medium and method, as the developer, an amphoteric compound having an acidic group for developing a leuco dye and a basic group for erasing the colored leuco dye, or a phenolic compound having long-chain alkyl is used. The recording medium and recording method utilize coloring of the leuco dye itself, and therefore, the contrast and recognizability are excellent, as compared to those of the low-molecular substance dispersion type recording medium. As a result, they are being widely used.

In the conventional technique disclosed in the above patent documents, only two colors, specifically, the color of the material for the matrix, i.e., color of the primary surface and the color changed by heat can be displayed. However, in recent years, for improving the recognizability and appearance, there are increasing strong demands of multicolor image display and recording of various data with color identification. For meeting the demands, a number of recording methods have been proposed, in which the above-mentioned conventional technique is applied and a multicolor image is displayed.

Unexamined Japanese Patent Application Laid-Open Specification Nos. 5-62189, 8-80682, and 2000-198275 disclose a recording medium in which layers or particles having different colors are rendered visible or hidden by a low-molecular substance dispersion type recording layer to achieve multicolor display, and a recording method using the same. However, in the recording medium having such a construction, the recording layer cannot completely hide the colors of the underlying layers and the color of the matrix is seen through, so that a high contrast cannot be obtained.

In Unexamined Japanese Patent Application Laid-Open Specification Nos. 8-58245 and 2000-25338, there are disclosures concerning reversible thermal multicolor recording media using a leuco dye, but these reversible thermal multicolor recording media have repeating units having different colors in the surface, and therefore the area ratio of the individual hues to the actually recorded portion is small. Thus, the recorded image is very dark or has a low contrast.

In Unexamined Japanese Patent Application Laid-Open Specification Nos. 6-305247, 6-328844, 6-79970, 8-164669, 8-300825, 9-52445, 11-138997, 2001-162941, and 2002-59654, there are disclosures concerning reversible thermal multicolor recording media having a construction in which recording layers using leuco dyes having different coloring temperatures, decoloring temperatures, and cooling rates are formed so that they are separated and independent from one another.

However, these reversible thermal multicolor recording media have problems in that temperature control is difficult using a recording heat source, such as a thermal head, and an excellent contrast cannot be obtained, so that an occurrence of fogging cannot be avoided. Further, it is very difficult to control the recording of multicolor, i.e., three colors or more merely by changing the heating temperature using a thermal head or the like and/or the cooling rate after heating.

On the other hand, in Unexamined Japanese Patent Application Laid-Open Specification No. 2001-1645, there is a disclosure concerning a recording method using a reversible thermal multicolor recording medium having a construction in which recording layers using leuco dyes are formed so that they are separated and independent from one another, in which only an arbitrary recording layer is heated and colored by light-to-heat transformation using a laser beam. In this method, only a desired recording layer can be colored by the effect of the wavelength selectivity of the light-to-heat transforming layer, possibly solving the problem of fogging accompanying the conventional reversible multicolor recording media.

However, the light-to-heat transforming layer and the recording layer are individually formed, and therefore the number of the constituent layers is large, causing the production process to be complicated. Further, the method has a problem in that energy generated by the light-to-heat transformation in the laser radiation is not efficiently transferred to the recording layer, so that satisfactory coloring cannot be achieved, thus prolonging the time for recording.

As mentioned above, there are strong demands on the multicolor thermal recording and studies are vigorously conducted, but a practically satisfactory recording medium or recording method has not yet been found.

SUMMARY OF THE INVENTION

In view of the above problems accompanying the prior art, in the present invention, there is provided a reversible multicolor thermal recording medium, which is advantageous not only in that the medium has stable coloring and decoloring properties and excellent contrast as well as image stability practically satisfactory in our daily life, but also in that the medium is high-speed printable and erasable, and a recording method using the same.

The reversible multicolor recording medium of the present invention comprises a supporting substrate, and a plurality of recording layers which comprise, respectively, reversible thermal coloring compositions having different colors, wherein the plurality of recording layers are separated from and stacked on one another on the supporting substrate, wherein the plurality of reversible thermal coloring compositions respectively comprise light-to-heat transforming materials which respectively absorb infrared rays having different wavelength ranges to generate heat.

The recording method of the present invention is a recording method using a reversible multicolor recording medium comprising a supporting substrate, and a plurality of recording layers which comprise, respectively, reversible thermal coloring compositions having different colors, wherein the plurality of recording layers are separated from and stacked on one another on the supporting substrate, wherein the plurality of reversible thermal coloring compositions respectively comprise light-to-heat transforming materials which respectively absorb infrared rays having different wavelength ranges to generate heat. The recording method of the present invention comprises: heating the recording medium so that each of the plurality of recording layers is in a decolored state; in accordance with predetermined image information, irradiating the recording medium with an infrared ray having a wavelength range corresponding to the recording layer selected from the recording layers; and allowing the recording layer selected to generate heat so that the recording layer is selectively colored, achieving recording of the image information.

In addition, the recording method of the present invention is a recording method using a reversible multicolor recording medium comprising a supporting substrate, and a plurality of recording layers which comprise, respectively, reversible thermal coloring compositions having different colors, wherein the plurality of recording layers are separated from and stacked on one another on the supporting substrate, wherein the plurality of reversible thermal coloring compositions respectively comprise light-to-heat transforming materials which respectively absorb infrared rays having different wavelength ranges to generate heat. The recording method of the present invention comprises: heating the recording medium so that each of the plurality of recording layers is in a colored state; in accordance with predetermined image information, irradiating the recording medium with an infrared ray having a wavelength range corresponding to the recording layer selected from the recording layers; and allowing the recording layer selected to generate heat so that the recording layer is selectively decolored, achieving recording of the image information.

In the present invention, there are obtained a reversible multicolor thermal recording medium, which is advantageous not only in that the medium has stable coloring and decoloring properties and excellent contrast as well as image stability practically satisfactory in our daily life, but also in that the medium is high-speed printable and erasable, and a recording method using the same.

In the present invention, there is provided a reversible multicolor recording medium such that radiation of an infrared ray having a selected wavelength selectively allow an arbitrary recording layer to generate heat and reversible conversion of the recording layer between a colored state and a decolored state can be achieved, thus making it possible to record and erase information repeatedly.

Further, the reversible multicolor recording medium of the present invention can simplify the production process, as compared to a reversible multicolor recording medium having a light-to-heat transforming material layer and a recording layer which are independently provided.

In addition, by the method of the present invention, light-to-heat transformation in the recording layer can be efficiently achieved to improve the recording sensitivity. Further, an occurrence of locally heating in the recording layer can be avoided to improve the repetition durability.

Additional features and advantages of the present invention are described in, and will be apparent from, the following Detailed Description of the Invention and the figures.

The above and other objects, features and advantages of the present invention will become more apparent from the following description of the embodiments of the invention taken in conjunction with the accompanying drawings.

DETAILED DESCRIPTION OF THE INVENTION

Figure 1:
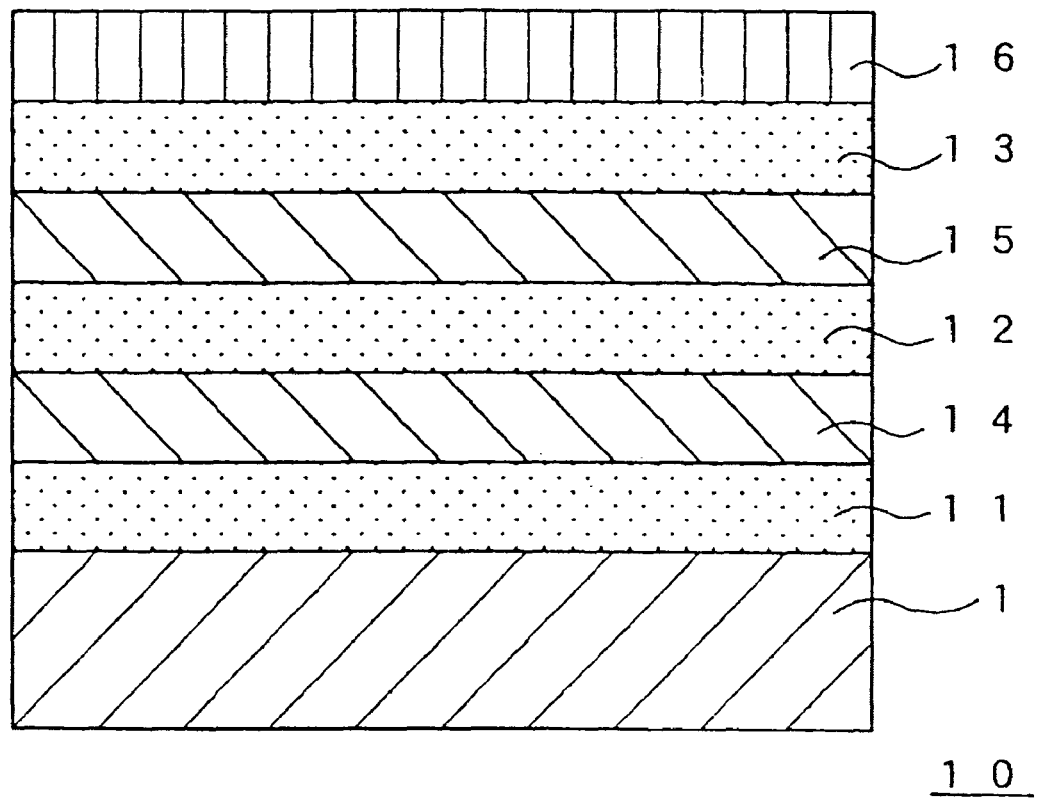
FIG. 1 is a diagrammatic cross-sectional view of one form of a reversible multicolor recording medium of the present invention.

Hereinbelow, the embodiments of the present invention will be described in detail with reference the accompanying drawings, but the following examples should not be construed as limiting the reversible multicolor recording medium of the present invention. FIG. 1 shows a diagrammatic cross-sectional view of the reversible multicolor recording medium of the present invention. A reversible multicolor recording medium 10 has a construction such that a first recording layer 1, a second recording layer 12, and a third recording layer 13 are stacked on one another respectively through heat insulating layers 14, 15 on a supporting substrate 1, and a protecting layer 16 is formed as the uppermost layer.

As the supporting substrate 1, any conventionally known materials can be used as long as they have excellent heat resistance and excellent planar dimensional stability. For example, it can be appropriately selected from polymer materials, such as polyester and rigid vinyl chloride; glass materials; metallic materials, such as stainless steel; and other materials, such as paper. In applications other than the application requiring transparency, e.g., overhead projector, for improving the recognizability of the information recorded on the reversible multicolor recording medium 10 finally obtained, it is preferred that the supporting substrate 1 is formed from a material having a white or metallic color and having a higher reflectance with respect to visible lights.

The first to third recording layers 11 to 13 are formed using a material which can be recorded stably and repeatedly and which can control the decolored state and colored state. Particularly, the first to third recording layers 11 to 13 respectively comprise light-to-heat transforming materials which respectively absorb infrared rays having different wavelengths ($\lambda_1$, $\lambda_2$, and $\lambda_3$ in FIG. 1) to generate heat, and the first to third recording layers 11 to 13 are individually formed by application of, for example, a leuco dye, a developer, and the light-to-heat transforming material dispersed in a resin matrix. The first to third recording layers 11 to 13 are formed using respectively predetermined leuco dyes according to the desired colors and, for example, when the first to third recording layers 11 to 13 are colored, respectively, three primary colors, a full color image can be formed on the reversible multicolor recording medium 10 as a whole.

As the leuco dye, existing leuco dyes for thermal recording paper and the like can be used. As the developer, organic acids having a long-chain alkyl group conventionally used as developers (described in, for example, Unexamined Japanese Patent Application Laid-Open Specification Nos. 5-124360, 7-108761, 7-188294, 2001-105733, and 2001-113829) can be used.

The first to third recording layers 11 to 13 respectively contain infrared absorbing dyes having absorptions respectively in different wavelength ranges. In the reversible multicolor recording medium 10 shown in FIG. 1, the first recording layer 11 contains a light-to-heat transforming material which absorbs an infrared ray having a wavelength $\lambda_1$ to generate heat, the second recording layer 12 contains a light-to-heat transforming material which absorbs an infrared ray having a wavelength $\lambda_2$ to generate heat, and the third recording layer 13 contains a light-to-heat transforming material which absorbs an infrared ray having a wavelength $\lambda_3$ to generate heat.

As the light-to-heat transforming materials contained in the first to third recording layers 11 to 13, there can be used phthalocyanine dyes, cyanine dyes, metal complex dyes, and diimmonium dyes, which are generally used as infrared absorbing dyes having almost no absorption in a visible light range. Further, for allowing only an arbitrary light-to-heat transforming material to generate heat, it is preferred to select a combination of the materials so that the absorption bands of the light-to-heat transforming materials are individually narrow and they do not overlap.

Examples of resins constituting the first to third recording layers 11 to 13 include polyvinyl chloride, polyvinyl acetate, vinyl chloride-vinyl acetate copolymers, ethyl cellulose, polystyrene, styrene copolymers, phenoxy resins, polyester, aromatic polyester, polyurethane, polycarbonate, polyacrylate, polymethacrylate, acrylic acid copolymers, maleic acid polymers, polyvinyl alcohol, modified polyvinyl alcohol, hydroxyethyl cellulose, carboxymethyl cellulose, and starch. If desired, an additive, such as an ultraviolet absorber, may be added to the resin.

The first to third recording layers 11 to 13 can be formed by applying to the individual surfaces a composition prepared by dissolving using a solvent or dispersing in the resin the leuco dye, the developer, the light-to-heat transforming material, and an additive. It is desired that the first to third recording layers 11 to 13 are formed so that the individual thickness becomes about 1 to 20 μm, further preferably about 3 to 15 μm. When the thickness of these layers is too small, a satisfactory coloring density cannot be obtained. On the other hand, when the thickness is too large, the heat capacity of the recording layer is increased, so that the coloring properties or decoloring properties may deteriorate.

It is desired that, between the first recording layer 11 and the second recording layer 12, and between the second recording layer 12 and the third recording layer 13, light-transmitting heat insulating layers 14, 15 are respectively formed. Thus, thermal conduction between the adjacent recording layers can be avoided, so that an occurrence of so-called fogging can be prevented.

The heat insulating layers 14, 15 can be formed using a conventionally known light-transmitting polymer. Examples include polyvinyl chloride, polyvinyl acetate, vinyl chloride-vinyl acetate copolymers, ethyl cellulose, polystyrene, styrene copolymers, phenoxy resins, polyester, aromatic polyester, polyurethane, polycarbonate, polyacrylate, polymethacrylate, acrylic acid copolymers, maleic acid polymers, polyvinyl alcohol, modified polyvinyl alcohol, hydroxyethyl cellulose, carboxymethyl cellulose, and starch. If desired, an additive, such as an ultraviolet absorber, may be added to the polymer.

In the heat insulating layers 14, 15, a light-transmitting inorganic film can be used. For example, it is preferred to use porous silica, alumina, titania, carbon, or a composite thereof since the thermal conductivity of the heat insulating layer is lowered. These layers can be formed by a sol-gel process in which a film can be formed from a liquid layer.

It is desired that the heat insulating layers 14, 15 are formed so that the individual thickness becomes about 3 to 100 μm, further preferably about 5 to 50 μm. When the thickness of these layers is too small, a satisfactory heat insulation effect cannot be obtained, and, when the thickness is too large, the thermal conductivity or light transmission properties of the heat insulating layer become inappropriate when whole of the recording medium is uniformly heated as described below.

The protecting layer 16 can be formed using a conventionally known ultraviolet curing resin or thermosetting resin, and it has desirably a thickness of 0.1 to 20 μm, further desirably about 0.5 to 5 μm. When the thickness of the protecting layer 16 is too small, a satisfactory protection effect cannot be obtained, and, when the thickness is too large, the thermal conduction is disadvantageously poor.

Next, the principles of the multicolor recording using the reversible multicolor recording medium 10 shown in FIG. 1 are described. First, the first principle of the multicolor recording is described. The whole surface of the reversible multicolor recording medium 10 shown in FIG. 1 is heated to a temperature at which the individual recording layers are decolored, for example, about 120° C., so that the first to third recording layers 11 to 13 are preliminarily in a decolored state. That is, in this instance, the color of the supporting substrate 1 is visible.

Then, an arbitrary portion of the reversible multicolor recording medium 10 is irradiated with an infrared ray having arbitrarily selected wavelength and power using, e.g., a semiconductor laser. For example, when coloring the first recording layer 11, the medium is irradiated with an infrared ray having a wavelength $\lambda_1$ at energy such that the first recording layer 11 reaches its coloring temperature to allow the light-to-heat transforming material to generate heat, and the electron donating color-forming compound and the electron accepting developer undergo a coloring reaction, so that the irradiated portion is colored.

When coloring the second recording layer 12 and the third recording layer 13, the medium is similarly irradiated with infrared rays having wavelengths $\lambda_2$, $\lambda_3$ at energy such that the second recording layer 12 and the third recording layer 13 reach the respective coloring temperatures to allow the individual light-to-heat transforming materials to generate heat, so that the irradiated portions can be colored. Thus, it is possible to color an arbitrary portion of the reversible multicolor recording medium 10, enabling full color image formation and various information recording.

In addition, the thus colored recording layer is further irradiated with an infrared ray having an arbitrary wavelength at energy such that the first to third recording layer 11 to 13 reach the respective decoloring temperature to allow the individual light-to-heat transforming material to generate heat, and the electron donating color-forming compound and the electron accepting developer undergo a color erasing reaction, so that the recording layer can be decolored.

Further, when part of the reversible multicolor recording medium 10 is colored as described above, whole of the reversible multicolor recording medium 10 is uniformly heated to a temperature at which all the recording layers are decolored, for example, 120° C., so that the recorded information or image can be erased, and a sequence of the above operations is repeated to make it possible to achieve recording repeatedly.

Next, the second principle of the multicolor recording is described. The whole surface of the reversible multicolor recording medium 10 shown in FIG. 1 is heated to a high temperature at which the individual recording layers are colored, for example, about 200° C., and then cooled so that each of the first to third recording layers 11 to 13 is preliminarily in a colored state.

Then, a desired portion of the reversible multicolor recording medium 10 is irradiated with an infrared ray having arbitrarily selected wavelength and power using, e.g., a semiconductor laser. For example, when decoloring the first recording layer 11, the medium is irradiated with an infrared ray having a wavelength $\lambda_1$ at energy such that the first recording layer 11 is decolored to allow the light-to-heat transforming material to generate heat, so that the recording layer 11 is in a decolored state. When decoloring the second recording layer 12 and the third recording layer 13, the medium is similarly irradiated with infrared rays having wavelengths $\lambda_2$, $\lambda_3$ at energy such that the second recording layer 12 and the third recording layer 13 reach the respective decoloring temperatures to allow the individual light-to-heat transforming materials to generate heat, so that the irradiated portions can be decolored. Thus, it is possible to decolor an arbitrary portion of the reversible multicolor recording medium 10, enabling full color image formation and various information recording.

In addition, the thus decolored recording layer is further irradiated with an infrared ray having an arbitrary wavelength at energy such that the first to third recording layers 11 to 13 reach the respective coloring temperature to allow the individual light-to-heat transforming material to generate heat, and the electron donating color-forming compound and the electron accepting developer undergo a coloring reaction, so that the recording layer can be colored.

Further, when part of the reversible multicolor recording medium 10 is decolored as described above, whole of the reversible multicolor recording medium 10 is uniformly heated to a temperature at which all the recording layers are colored, for example, 200° C. and then cooled, so that the recorded information or image can be erased, and a sequence of the above operations is repeated to make it possible to achieve recording repeatedly.

A recording method for the reversible multicolor recording medium 10 of the present invention is appropriately selected from the above-described recording methods depending on the properties of the recording layers and the performance of the recording light source. For example, the recording layer may be formed either as a so-called positive layer which is colored at a high temperature and decolored at a temperature lower than that temperature or as a so-called negative layer which is decolored at a high temperature and colored at a temperature lower than that temperature (see, for example, Unexamined Japanese Patent Application Laid-Open Specification No. 8-197853).

EXAMPLES

Next, the reversible multicolor recording medium of the present invention will be described in more detail with reference to the following Examples and Comparative Examples, which should not be construed as limiting the reversible multicolor recording medium of the present invention.

Example 1

Figure 2:
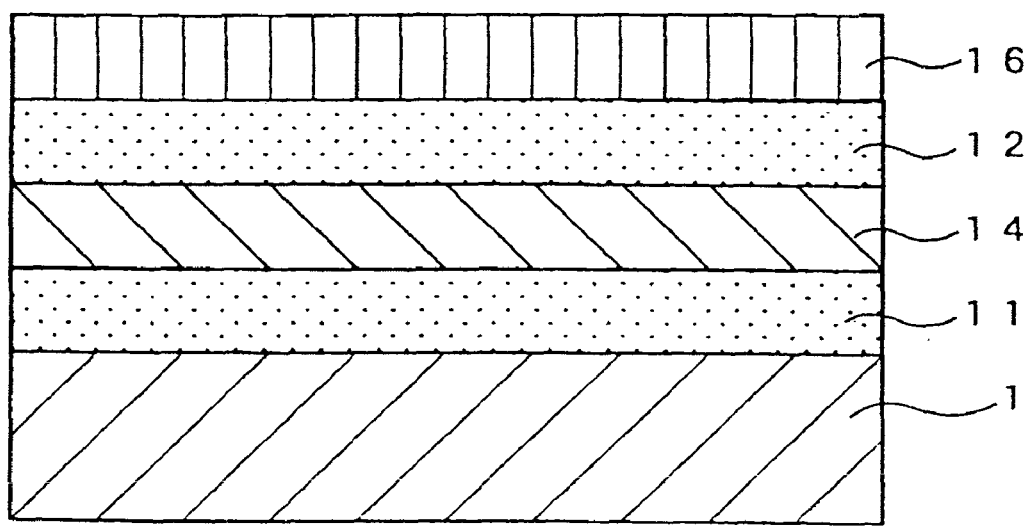
FIG. 2 is a diagrammatic cross-sectional view of the reversible multicolor recording medium prepared in Example 1.

In this Example, a recording medium 30 having two reversible recording layers shown in FIG. 2 is prepared in which a first recording layer 11, a heat insulating layer 14, a second recording layer 12, and a protecting layer 16 are successively stacked on one another on a supporting substrate 1. As the supporting substrate 1, a white polyethylene terephthalate substrate having a thickness of 1 mm was prepared. Then, as the first recording layer 11, the composition shown below was applied onto the supporting substrate 1 by means of a wire bar, and dried by heating at 110° C. for 5 minutes to form a recording layer having a thickness of 6 μm and being capable of being colored black. In this case, the absorbance at a wavelength of 830 nm was 1.0.

(Composition)

Leuco dye (Black-15; manufactured and sold by YAMAMOTO CHEMICALS Inc.): 1 Part by weight.

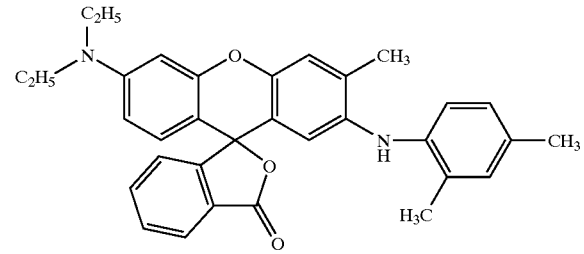

Developer (substance below): 4 Parts by weight.

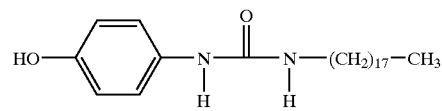

Vinyl chloride-vinyl acetate copolymer: 10 Parts by weight {vinyl chloride: 90%; vinyl acetate: 10%; average molecular weight (M.W.): 115,000}.

Cyanine infrared absorbing dye: 0.08 Part by weight (YKR-2900; manufactured and sold by YAMAMOTO CHEMICALS Inc.; absorption wavelength peak in the recording layer: 830 nm).

Tetrahydrofuran (THF): 140 Parts by weight.

An aqueous solution of polyvinyl alcohol was applied onto the above-formed first recording layer 11 and dried to form a heat insulating layer 14 having a thickness of 20 μm. As the second recording layer 12, the composition below shown was applied onto the heat insulating layer 14 by means of a wire bar, and dried by heating at 110° C. for 5 minutes to form a layer having a thickness of 6 μm and being capable of being colored magenta. The absorbance at a wavelength of 785 nm was 1.0.

(Composition)

Leuco dye (Red DCF; manufactured and sold by HODOGAYA CHEMICAL CO., LTD.): 2 Parts by weight.

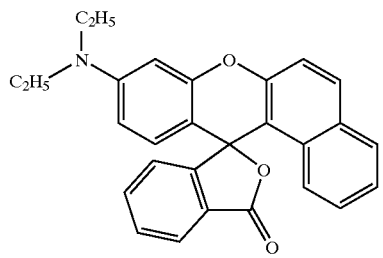

Developer (substance below): 4 Parts by weight.

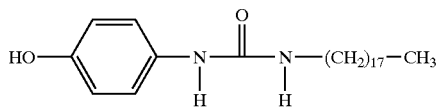

Vinyl chloride-vinyl acetate copolymer: 10 Parts by weight (vinyl chloride: 90%; vinyl acetate: 10%; M.W.: 115,000).

Cyanine infrared absorbing dye: 0.08 Part by weight (CY-10; manufactured and sold by Nippon Kayaku Co., Ltd.; absorption wavelength peak in the recording layer: 790 nm).

Tetrahydrofuran (THF): 140 Parts by weight.

A protecting layer 16 having a thickness of about 2 μm was formed on the second recording layer 12 using an ultraviolet curing resin to prepare a desired reversible multicolor recording medium 30. The thus prepared reversible multicolor recording medium was uniformly heated using a ceramic bar heated to 120° so that the first and second recording layers 11, 12 were in a decolored state, and then used as a sample.

Example 2

The reversible multicolor recording medium prepared in Example 1 was heated using a ceramic bar heated to 180° C. and then cooled so that each of the first recording layer 11 and the second recording layer 12 was preliminarily colored, and then used as a sample.

Example 3

In this Example, a recording medium having three reversible recording layers shown in FIG. 1 is prepared in which a first recording layer 11, a heat insulating layer 14, a second recording layer 12, a heat insulating layer 15, a third recording layer 13, and a protecting layer 16 are successively stacked on one another on a supporting substrate 1. As the supporting substrate 1, a white polyethylene terephthalate substrate having a thickness of 1 mm was prepared. As the first recording layer 11, the composition shown below was applied onto the supporting substrate 1 by means of a wire bar, and dried by heating at 110° C. for 5 minutes to form a layer having a thickness of 6 μm and being capable of being colored green. In this case, the absorbance at a wavelength of 915 nm was 1.0.

(Composition)

Leuco dye (Green DCF; manufactured and sold by HODOGAYA CHEMICAL CO., LTD.): 1 Part by weight.

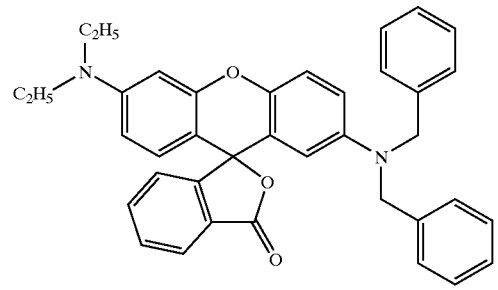

Developer (substance below): 4 Parts by weight.

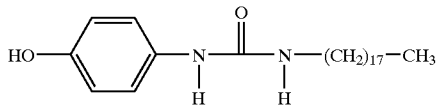

Vinyl chloride-vinyl acetate copolymer: 10 Parts by weight (vinyl chloride: 90%; vinyl acetate: 10%; M.W.: 115,000).

Cyanine infrared absorbing dye: 0.10 Part by weight.

(YKR-2081; manufactured and sold by YAMAMOTO CHEMICALS Inc.; absorption wavelength peak in the recording layer: 910 nm).

Tetrahydrofuran (THF): 140 Parts by weight

An aqueous solution of polyvinyl alcohol was applied onto the above-formed first recording layer 11 and dried to form a heat insulating layer 14 having a thickness of 20 μm.

As the second recording layer 12, the composition shown below was applied onto the heat insulating layer 14 by means of a wire bar, and dried by heating at 110° C. for 5 minutes to form a layer having a thickness of 6 μm and being capable of being colored cyan. In this case, the absorbance at a wavelength of 830 nm was 1.0.

(Composition)

Leuco dye (H-3035; manufactured and sold by Yamada Chemical Co., Ltd.): 1 Part by weight.

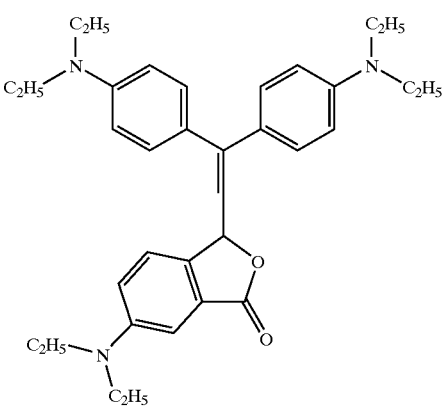

Developer (substance below): 4 Parts by weight.

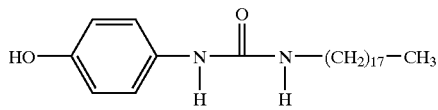

Vinyl chloride-vinyl acetate copolymer: 10 Parts by weight (vinyl chloride: 90%; vinyl acetate: 10%; M.W.: 115,000).

Cyanine infrared absorbing dye: 0.08 Part by weight.

(YKR-2900; manufactured and sold by YAMAMOTO CHEMICALS Inc.; absorption wavelength peak in the recording layer: 830 nm)

Tetrahydrofuran (THF): 140 Parts by weight.

An aqueous solution of polyvinyl alcohol was applied onto the above-formed second recording layer 12 and dried to form a heat insulating layer 15 having a thickness of 20 µm.

As the third recording layer 13, the composition shown below was applied onto the heat insulating layer 15 by means of a wire bar, and dried by heating at 110° C. for 5 minutes to form a layer having a thickness of 6 µm and being capable of being colored magenta. In this case, the absorbance at a wavelength of 785 nm was 1.0.

(Composition)

Leuco dye (Red DCF; manufactured and sold by HODOGAYA CHEMICAL CO., LTD.): 2 Parts by weight.

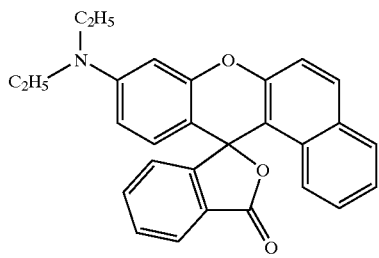

Developer (substance below): 4 Parts by weight.

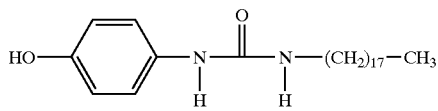

Vinyl chloride-vinyl acetate copolymer: 10 Parts by weight (vinyl chloride: 90%; vinyl acetate: 10%; M.W.: 115,000).

Cyanine infrared absorbing dye: 0.08 Part by weight.

(CY-10; manufactured and sold by Nippon Kayaku Co., Ltd.; absorption wavelength peak in the recording layer: 790 nm).

Tetrahydrofuran (THF): 140 Parts by weight.

A protecting layer 16 having a thickness of about 2 µm was formed on the third recording layer 13 using an ultraviolet curing resin to prepare a desired reversible multicolor recording medium. The thus prepared reversible multicolor recording medium was uniformly heated using a ceramic bar heated to 120° C. so that the first, second, and third recording layers 11, 12, 13 were in a decolored state, and then used as a sample.

Example 4

The reversible multicolor recording medium prepared in Example 3 was heated using a ceramic bar heated to 180° C. and then cooled so that each of the first recording layer 11, the second recording layer 12, and the third recording layer 13 was preliminarily colored, and then used as a sample.

Comparative Example 1

Figure 3:
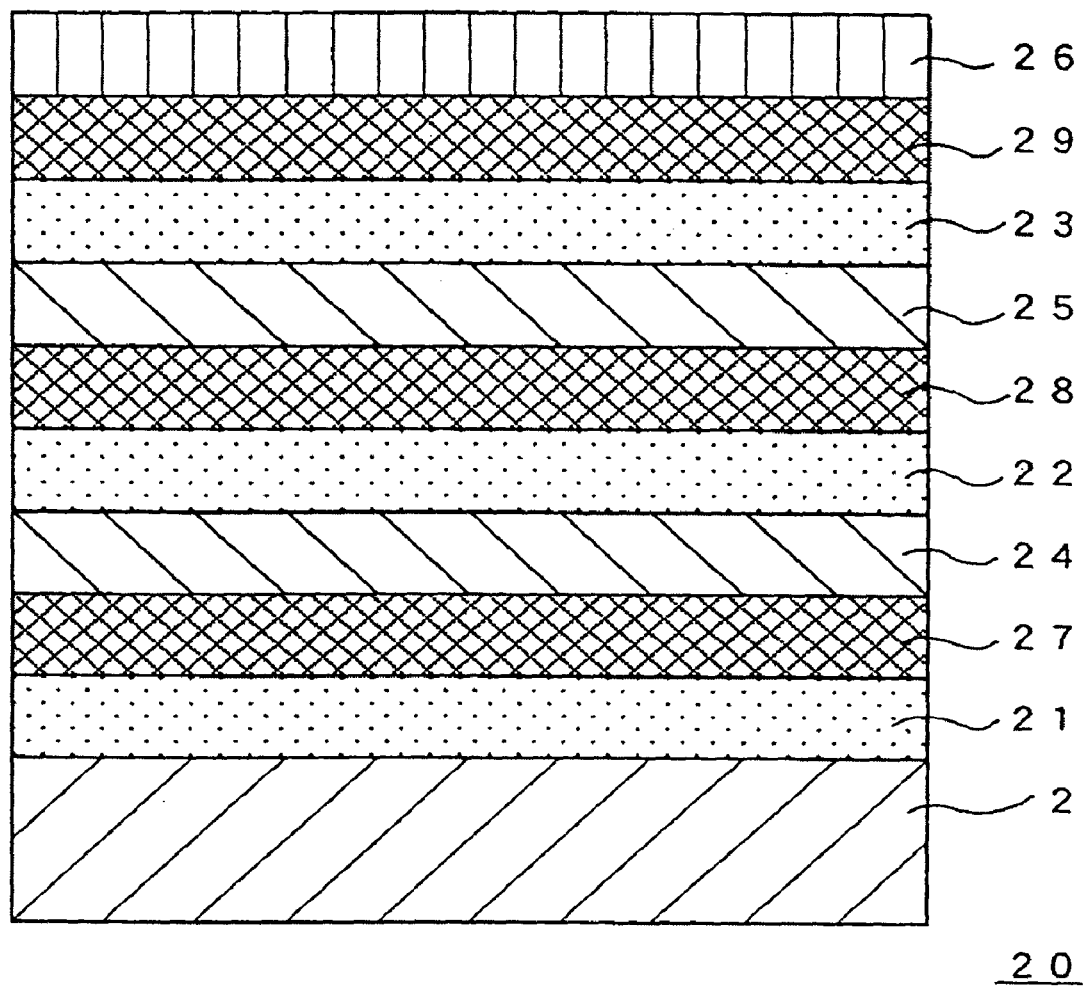
FIG. 3 is a diagrammatic cross-sectional view of the reversible multicolor recording medium prepared in Comparative Example 1.

In this Example, a recording medium having a construction disclosed in Unexamined Japanese Patent Application Laid-Open Specification No. 2001-1645, in which a recording layer and a light-to-heat transforming layer are stacked on one another, is prepared. FIG. 3 shows a diagrammatic cross-sectional view of a reversible multicolor recording medium 20 in this Comparative Example.

As a supporting substrate 2, a white polyethylene terephthalate substrate having a thickness of 1 mm was prepared. Then, as a first recording layer 21, the composition shown below was applied onto the supporting substrate 2 by means of a wire bar, and dried by heating at 110° C. for 5 minutes to form a layer having a thickness of 6 µm and being capable of being colored green.

(Composition)

Leuco dye (Green DCF; manufactured and sold by HODOGAYA CHEMICAL CO., LTD.): 1 Part by weight.

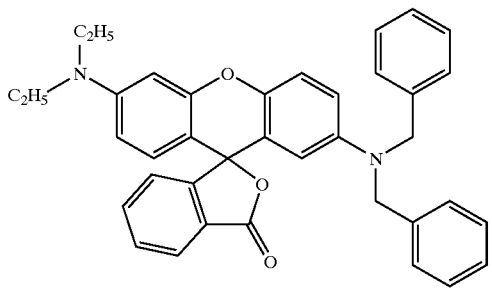

Developer (substance below): 4 Parts by weight.

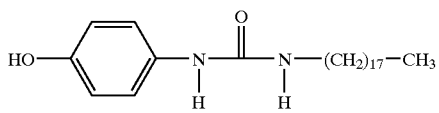

Vinyl chloride-vinyl acetate copolymer: 10 Parts by weight (vinyl chloride: 90%; vinyl acetate: 10%; M.W.: 115,000).

Tetrahydrofuran (THF): 140 Parts by weight.

A 0.5 wt % acetone solution of a cyanine infrared absorbing dye (YKR-2081; manufactured and sold by YAMAMOTO CHEMICALS Inc.) was spin-coated onto the above-formed first recording layer 21 to form a first light-to-heat transforming layer 27 having an absorbance of 1.0 at a wavelength of 915 nm. Then, an aqueous solution of polyvinyl alcohol was applied onto the first light-to-heat transforming layer 27 and dried to form a heat insulating layer 24 having a thickness of 20 µm. As a second recording layer 22, the composition shown below was applied onto the heat insulating layer 24 by means of a wire bar, and dried by heating at 110° C. for 5 minutes to form a layer having a thickness of 6 µm and being capable of being colored cyan.

(Composition)

Leuco dye (H-3035; manufactured and sold by Yamada Chemical Co., Ltd.): 1 Part by weight.

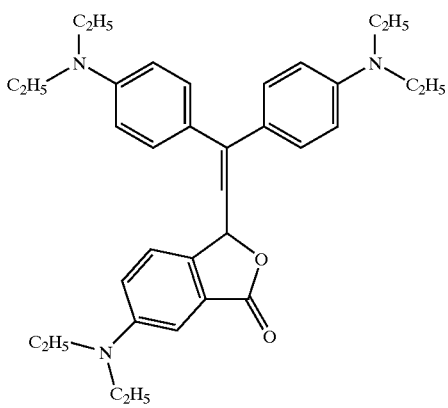

Developer (substance below): 4 Parts by weight.

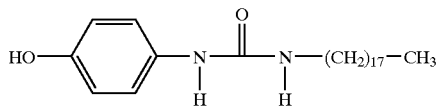

Vinyl chloride-vinyl acetate copolymer: 10 Parts by weight (vinyl chloride: 90%; vinyl acetate: 10%; M.W.: 115,000).

Tetrahydrofuran (THF): 140 Parts by weight.

A 0.3 wt % acetone solution of a cyanine infrared absorbing dye (YKR-2900; manufactured and sold by YAMAMOTO CHEMICALS Inc.) was spin-coated onto the above-formed second recording layer 22 to form a second light-to-heat transforming layer 28 having an absorbance of 1.0 at a wavelength of 830 nm. Then, an aqueous solution of polyvinyl alcohol was applied onto the second light-to-heat transforming layer 28 and dried to form a heat insulating layer 25 having a thickness of 20 µm. As a third recording layer 23, the composition shown below was applied onto the heat insulating layer 25 by means of a wire bar, and dried by heating at 110° C. for 5 minutes to form a layer having a thickness of 6 µm and being capable of being colored magenta.

(Composition)

Leuco dye (Red DCF; manufactured and sold by HODOGAYA CHEMICAL CO., LTD.): 2 Parts by weight.

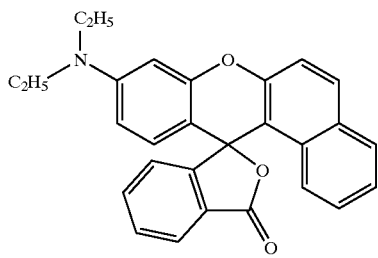

Developer (substance below): 4 Parts by weight

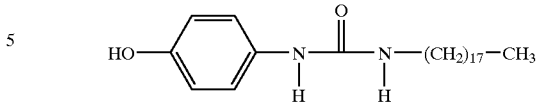

Vinyl chloride-vinyl acetate copolymer: 10 Parts by weight (vinyl chloride: 90%; vinyl acetate: 10%; M.W.: 115,000).

Tetrahydrofuran (THF): 140 Parts by weight.

A 0.3 wt % acetone solution of a cyanine infrared absorbing dye (CY-10; manufactured and sold by Nippon Kayaku Co., Ltd.) was spin-coated onto the above-formed second recording layer 22 to form a third light-to-heat transforming layer 29 having an absorbance of 1.0 at a wavelength of 785 nm. Then, a protecting layer 26 having a thickness of about 2 µm was formed on the third light-to-heat transforming layer 29 using an ultraviolet curing resin to prepare a desired reversible multicolor recording medium 20.

The thus prepared reversible multicolor recording medium 20 was uniformly heated using a ceramic bar heated to 120° C. so that the first, second, and third recording layers 21, 22, 23 were in a decolored state, and then used as a sample.

The method for evaluating the reversible multicolor recording medium and the results of evaluation are described below.

(Measurement of Recorded Line Width)

An arbitrary position of the reversible multicolor recording medium as a sample was irradiated with semiconductor lasers having three different wavelengths, i.e., 785 nm, 830 nm, and 915 nm and having a power of 70 mW and a spot diameter of 80 µm while scanning the lasers at speeds of 300 mm/sec and 500 mm/sec to measure a recorded line width.

(Measurement of reflection density)

Parallel lines were recorded at a space of 60 µm on an arbitrary position of the reversible multicolor recording medium as a sample using semiconductor lasers having wavelengths of 785 nm, 830 nm, and 915 nm and having a power of 70 mW and a spot diameter of 80 µm under conditions such that the scanning speed was 300 mm/s, so that a solid image was recorded. With respect to the recorded sample, a reflectance was measured by means of an autographic spectrophotometer having an integrating sphere to determine a reflection density (reflectance) at a peak wavelength.

(Evaluation of Decoloring Properties)

Parallel lines were recorded at a space of 60 µm on an arbitrary position of the reversible multicolor recording medium as a sample using semiconductor lasers having wavelengths of 785 nm, 830 nm, and 915 nm and having a power of 70 mW and a spot diameter of 80 µm under conditions such that the scanning speed was 300 mm/s, so that a solid image was recorded. Then, the sample was irradiated with semiconductor lasers having wavelengths of 785 nm, 830 nm, and 915 nm and having a power of 70 mW and a spot diameter of 200 µm while scanning the lasers at a speed of 200 mm/sec to erase the recorded portion. With respect to the erased sample, a reflectance was measured by means of an autographic spectrophotometer having an integrating sphere to determine a difference between the reflection density (reflectance) at a peak wavelength and the reflection density of the primary (unrecorded) surface (primary surface density).

(Evaluation of Repetition Properties)

Lines were recorded on a desired position of the reversible multicolor recording medium as a sample using semiconductor lasers having wavelengths of 785 nm, 830 nm, and 915 nm and having a power of 70 mW and a spot diameter of 80 μm under conditions such that the scanning speed was 300 mm/s, and then the lines were erased using a ceramic bar at 120° C. This test operation was repeated 100 times with respect to the same portion of each medium. The recorded portion was examined through a microscope to evaluate deterioration of the sample.

Evaluation Results 1

With respect to each of the recording media in Example 1, Example 3, and Comparative Example 1, writing was conducted using laser beams having wavelengths of 915 nm, 830 nm, and 785 nm and having a power of 70 mW. The results of measurement of the recorded line width at a scanning speed of 300 mm/s are shown in Table 1 below, and the results at a scanning speed of 500 mm/s are shown in Table 2 below.

Evaluation Results 2

With respect to each of the recording media in Example 3 and Comparative Example 1, a solid image was recorded using laser beams having wavelengths of 915 nm, 830 nm, and 785 nm under conditions such that the power was 70 mW and the spot diameter was 80 μm, and the reflection density at a peak wavelength in the obtained reflectance properties was evaluated. The results of the evaluation are shown in Table 3 below.

TABLE 3

| Medium | Laser wavelength | Layer to be recorded | Reflection density | Peak wavelength |
|---|---|---|---|---|
| Exp. 3 | 915 | First recording layer | 0.85 | 600 |
|  | 830 | Second recording layer | 1.36 | 660 |
|  | 785 | Third recording layer | 0.95 | 530 |
| Comp. Exp. 1 | 915 | First recording layer | 0.69 | 600 |
|  | 830 | Second recording layer | 0.99 | 660 |
|  | 785 | Third recording layer | 0.80 | 530 |

TABLE 1

| Medium | Laser wavelength (nm) | Spot diameter (μm) | Scan speed (mm/s) | Layer to be recorded | Recorded line width (μm) |
|---|---|---|---|---|---|
| Exp. 1 | 830 | 80 | 300 | First recording layer | 49 |
| Exp. 1 | 785 | 80 | 300 | Second recording layer | 52 |
| Exp. 3 | 915 | 80 | 300 | First recording layer | 48 |
| Exp. 3 | 830 | 80 | 300 | Second recording layer | 49 |
| Exp. 3 | 785 | 80 | 300 | Third recording layer | 52 |
| Comp. Exp. 1 | 915 | 80 | 300 | First recording layer | 42 |
| Comp. Exp. 1 | 830 | 80 | 300 | Second recording layer | 43 |
| Comp. Exp. 1 | 785 | 80 | 300 | Third recording layer | 47 |
| Exp. 1 | 830 | 150 | 300 | First recording layer | 61 |
| Exp. 1 | 785 | 150 | 300 | Second recording layer | 63 |
| Exp. 3 | 915 | 150 | 300 | First recording layer | 59 |
| Exp. 3 | 830 | 150 | 300 | Second recording layer | 59 |
| Exp. 3 | 785 | 150 | 300 | Third recording layer | 62 |
| Comp. Exp. 1 | 915 | 150 | 300 | First recording layer | 47 |
| Comp. Exp. 1 | 830 | 150 | 300 | Second recording layer | 48 |
| Comp. Exp. 1 | 785 | 150 | 300 | Third recording layer | 52 |

TABLE 2

| Medium | Laser wavelength | Spot diameter | Scanning speed | Layer to be recorded | Recorded line width |
|---|---|---|---|---|---|
| Exp. 1 | 830 | 80 | 500 | First recording layer | 48 |
| Exp. 1 | 785 | 80 | 500 | Second recording layer | 42 |
| Exp. 3 | 915 | 80 | 500 | First recording layer | 38 |
| Exp. 3 | 830 | 80 | 500 | Second recording layer | 39 |
| Exp. 3 | 785 | 80 | 500 | Third recording layer | 43 |
| Comp. Exp. 1 | 915 | 80 | 500 | First recording layer | Not recorded |
| Comp. Exp. 1 | 830 | 80 | 500 | Second recording layer | Not recorded |
| Comp. Exp. 1 | 785 | 80 | 500 | Third recording layer | 18 |
| Exp. 1 | 830 | 150 | 500 | First recording layer | 34 |
| Exp. 1 | 785 | 150 | 500 | Second recording layer | 37 |
| Exp. 3 | 915 | 150 | 500 | First recording layer | 33 |
| Exp. 3 | 830 | 150 | 500 | Second recording layer | 34 |
| Exp. 3 | 785 | 150 | 500 | Third recording layer | 38 |
| Comp. Exp. 1 | 915 | 150 | 500 | First recording layer | Not recorded |
| Comp. Exp. 1 | 830 | 150 | 500 | Second recording layer | Not recorded |
| Comp. Exp. 1 | 785 | 150 | 500 | Third recording layer | Not recorded |

From the results shown in Tables 1 and 2 above, it is found that the recorded line width in each of the media in Examples 1 and 3 is larger than the recorded line width in the medium in Comparative Example 1, indicating that the lights radiated are efficiently transformed to heat to color the recording layers in Examples 1 and 3.

It is found that the solid image recorded on the medium in Example 3 has a higher reflection density than that of the solid image recorded on the medium in Comparative Example 1, indicating that the lights radiated are efficiently transformed to heat to color the recording layers in Example 3. In other words, in the recording medium of the present invention, by virtue of employing the construction in which the light-to-heat transforming material is uniformly dispersed in the recording layer, the recording sensitivity and the reflection density can be improved.

Evaluation Results 3

With respect to each of the recording media in Example 3 and Comparative Example 1, a solid image was recorded using laser beams having wavelengths of 915 nm, 830 nm, and 785 nm, and then the recorded image was irradiated with laser beams having wavelengths of 785 nm, 830 nm, and 915 nm and having a power of 70 mW and a spot diameter of 200 μm while scanning the lasers at a speed of 200 mm/sec to erase the recorded portion, and a difference between the reflection density of the erased portion and the reflection density of the primary (unrecorded) surface (primary surface density) was measured. The results of the measurement are shown in Table 4 below.

TABLE 4

| Medium | Laser wavelength (nm) | Layer to be erased | Difference between reflection density and primary surface density | Peak wavelength (nm) |
|---|---|---|---|---|
| Exp. 3 | 915 | First recording layer | 0.02 | 600 |
|  | 830 | Second recording layer | 0.02 | 660 |
|  | 785 | Third recording layer | 0.01 | 530 |
| Comp. Exp. 1 | 915 | First recording layer | 0.05 | 600 |
|  | 830 | Second recording layer | 0.06 | 660 |
|  | 785 | Third recording layer | 0.03 | 530 |

It is found that the recording medium in Example 3 has a reflection density of the erased portion of 0.02 or less at each wavelength and is in an almost colorless state, whereas, the medium in Comparative Example 1 has a reflection density of the erased portion higher than that in Example 3, indicating that the erasing is unsatisfactory in Comparative Example 1. The reason for this is as follows. The recording medium in Example 3 has a construction such that the light-to-heat transforming material is uniformly dispersed in the recording layer, and therefore heat transfer in the recording layer is uniform, so that the recorded portion can be efficiently erased. By contrast, the medium in Comparative Example 1 has a light-to-heat transforming layer and a recording layer which are independently provided, and hence a heat gradient is caused in the recording layer and a portion remaining colored is caused or the recording layer locally reaches the coloring temperature and satisfactory decoloring cannot be achieved, so that the reflection density becomes higher.

Further, in the reversible multicolor recording medium of the present invention having the construction in which the light-to-heat transforming material is uniformly dispersed in the recording layer, satisfactory decoloring properties can be obtained. Therefore, each of the reversible multicolor recording media prepared in Examples 2 and 4 is heated using a ceramic bar heated to 180° C. and then cooled so that the medium is preliminarily in a colored sate, and then the recorded portion is erased by irradiation of laser beams having wavelengths of 915 nm, 830 nm, and 785 nm, so that a multicolor recorded image can be obtained. The image obtained exhibited the coloring properties and contrast as well as precision equivalent to those of the multicolor recorded images in Examples 1 and 3, which were first erased and then recorded.

Evaluation Results 4

With respect to each of the recording media in Example 3 and Comparative Example 1, lines were recorded using laser beams having wavelengths of 915 nm, 830 nm, and 785 nm, and then the lines were erased using a ceramic bar at 120° C. This test operation was repeated 100 times with respect to the same portion of each medium. The recorded position was examined through a microscope, and the results are shown in Table 5 below.

TABLE 5

| Medium | Laser wavelength (nm) | Layer to be recorded | Results of examination through microscope |
|---|---|---|---|
| Exp. 3 | 915 | First recording layer | No change |
|  | 830 | Second recording layer | No change |
|  | 785 | Third recording layer | No change |
| Comp. Exp. 1 | 915 | First recording layer | Deterioration found in the recording layer |
|  | 830 | Second recording layer | Deterioration found in the recording layer |
|  | 785 | Third recording layer | Deterioration found in the recording layer |

In the medium in Example 3, after the 100-time repetition of a cycle of the recording and erasing, no deterioration was observed in the recording layer. However, in the medium in Comparative Example 1, after the 100-time repetition of a cycle of the recording and erasing, deterioration was found in the center portion of the recorded lines in the recording layer. The reason for this is that, in the medium in Comparative Example 1, the light-to-heat transforming layer having a smaller thickness transforms a strong laser to heat and the temperature of this layer locally rises, causing the recording layer to locally deteriorate. It is presumed that, in Example 3 according to the method of the present invention, by virtue of having the construction in which the light-to-heat transforming material is uniformly dispersed in the recording layer, an occurrence of locally heating is prevented, improving the durability of the recording layer.

As mentioned above, the reversible multicolor recording medium of the present invention has a feature such that light-to-heat transforming materials which respectively absorb infrared rays having different wavelength ranges to generate heat are uniformly dispersed, respectively, in reversible thermal coloring compositions having different colors and a plurality of layers comprising the respective compositions are stacked on one another, and thus it is advantageous not only in that the medium has stable coloring and decoloring properties and excellent contrast as well as image stability practically satisfactory in our daily life, but also in that the medium is high-speed printable and erasable. Further, in the reversible multicolor recording medium of the present invention, the light-to-heat transforming material layer and the recording layer are not individually provided, but the same layer has both functions of these layers. Therefore, the production process for the medium is simplified and hence advantageous from the viewpoint of reduction in the cost.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A reversible multicolor recording medium comprising:
a supporting substrate; and
a plurality of recording layers including, respectively, a plurality of reversible thermal coloring compositions having different colors, wherein said plurality of recording layers are separated from and stacked on one another on said supporting substrate,
wherein said plurality of reversible thermal coloring compositions respectively includes light-to-heat transforming materials which absorb infrared rays having different wavelength ranges to generate heat.

2. The reversible multicolor recording medium according to claim 1, wherein
said plurality of recording layers are stacked on one another individually through heat insulating layers on said supporting substrate.

3. The reversible multicolor recording medium according to claim 2, wherein a protecting layer is formed on the uppermost surface thereof of the recording medium.

4. The reversible multicolor recording medium according to claim 3, wherein each of said recording layers contains a color-forming compound having electron donating properties and a developer having electron accepting properties, and said color-forming compound and said developer undergo a reversible reaction to reversibly change the recording layer between a colored state and a decolored state.

5. The reversible multicolor recording medium according to claim 2, wherein each of said recording layers contains a color-forming compound having electron donating properties and a developer having electron accepting properties, and said color-forming compound and said developer undergo a reversible reaction to reversibly change the recording layer between a colored state and a decolored state.

6. The reversible multicolor recording medium according to claim 1, wherein a protecting layer is formed on the uppermost surface of the recording medium.

7. The reversible multicolor recording medium according to claim 6, wherein each of said recording layers contains a color-forming compound having electron donating properties and a developer having electron accepting properties, and said color-forming compound and said developer undergo a reversible reaction to reversibly change the recording layer between a colored state and a decolored state.

8. The reversible multicolor recording medium according to claim 1, wherein each of said recording layers contains a color-forming compound having electron donating properties and a developer having electron accepting properties, and said color-forming compound and said developer undergo a reversible reaction to reversibly change the recording layer between a colored state and a decolored state.

9. A recording method using a reversible multicolor recording medium comprising a supporting substrate, and a plurality of recording layers including, respectively, reversible thermal coloring compositions having different colors, wherein said plurality of recording layers are separated from and stacked on one another on said supporting substrate, and said plurality of reversible thermal coloring compositions respectively include light-to-heat transforming materials which respectively absorb infrared rays having different wavelength ranges to generate heat, said recording method comprising:
heating said recording medium so that each of said plurality of recording layers is in a decolored state;
irradiating said recording medium with an infrared ray having a wavelength range corresponding to the recording layer selected from said recording layers in accordance with predetermined image information; and
recording said image information by making the recording layer generate heat and selectively coloring the recording layer.

10. A recording method using a reversible multicolor recording medium comprising a supporting substrate, and a plurality of recording layers including, respectively, reversible thermal coloring compositions having different colors, wherein said plurality of recording layers are separated from and stacked on one another on said supporting substrate, and said plurality of reversible thermal coloring compositions respectively include light-to-heat transforming materials which respectively absorb infrared rays having different wavelength ranges to generate heat,
said recording method comprising:
heating said recording medium so that each of said plurality of recording layers is in a colored state;
irradiating said recording medium with an infrared ray having a wavelength range corresponding to the recording layer selected from said recording layers in accordance with predetermined image information; and
recording said image information by making the recording layer generate heat and selectively decoloring the recording layer.

* * * * *